United States Patent Office 2,712,016
Patented June 28, 1955

2,712,016

DERIVATIVES OF CAFFEINE

Albert Schlesinger, Nathan Weiner, and Samuel M. Gordon, New York, N. Y., assignors to Endo Products Inc., Richmond Hill, N. Y., a corporation of New York No Drawing. Application June 6, 1952,
Serial No. 292,194

9 Claims. (Cl. 260—253)

This invention relates to derivatives of 7'-carboxy-caffeine also designated as theophylline-7-acetic acid; and more particularly is directed to: (a) theophylline-7-(4-hydroxy-3,5-diiodo-benzyl)-acetic acid, (b) the related (halogenated benzyl) compounds, (c) the corresponding non-halogenated compounds, (d) the corresponding benzylidene compounds of the foregoing, (e) the salts of the foregoing acids, and (f) methods of producing the aforesaid compounds.

Iodinated compounds embodying a polyhalogenated, hydroxy-benzyl group have been proposed for use as X-ray contrast media, as for example in cholecystography. The iodinated compounds have been preferred to the brominated compounds because the greater atomic weight of the iodine atom produced greater opacity to the X-ray. However, the molecular structures of the compounds heretofore used for such purpose have been those in which the part of the molecule, other than the halogenated hydroxy benzenoid nucleus (the opaque nucleus), has been chosen primarily as a carrier for that nucleus. Such other part of the molecule has been generally of neutral character.

We have conceived of employing a class of compounds which contains: (a) both an opaque nucleus and a structure that possesses properties which enables the whole molecule to be more readily transported through the system and eliminated therefrom; and (b) is also a chemotherapeutic agent. Such compounds are exemplified by theophylline-7-(4-hydroxy-3,5-diiodo-benzyl)-acetic acid.

Accordingly, it is among the principal objects of this invention to provide novel compounds which are stable for use as X-ray contrast agents or chemotherapeutic agents.

Other objects are the provision of novel compounds employed in the synthesis of the ultimate compounds, and also the provision of methods for achieving the synthesis of the ultimate and intermediate products aforesaid.

In the course of our investigations we found, surprisingly, that a salt, e. g. the sodium or potassium salt of theophylline-7-acetic acid, could be reacted with p-hydroxy benzaldehyde in accordance with the Perkin reaction (or modification thereof) to produce a benzal in which the benzylidene radicals entered the molecule in alpha position with respect to the carboxy group. We also found that the benzal can be hydrogenated to yield the corresponding benzylated product, and we found, further, that such benzylated product could be subjected to halogenation so that the halogens entered the benzenoid nucleus.

The course of the reactions above summarized are as follows:

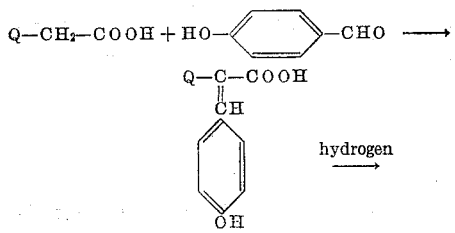

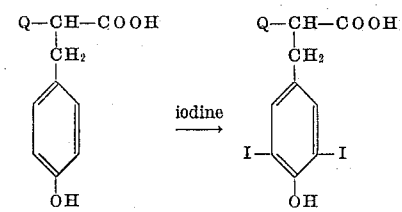

wherein Q represents the portion of the caffeine molecule to which is affixed the 7' carbon atom, i. e.

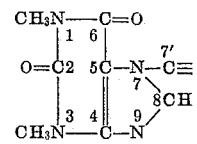

Accordingly, the above new class of halogenated compounds is typified by the following formula:

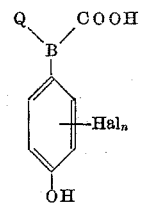

wherein Q has the significance above defined, and $n$ is a small integer.

In carrying out the condensation of the theophylline-7-acetic acid with the p-hydroxy-benzaldehyde there may be used the salts of the acids such as the sodium or potassium salts under anhydrous conditions in the presence of acetic anhydride; or in the form of the free acid and with the aid of a catalyst as for example a tertiary amine such as triethylamine or tributylamine. The benzal thus produced may be utilized for its own properties.

The benzal may also be hydrogenated by means of hydrogen and Raney nickel or palladium-charcoal-catalyst to yield theophylline-7-(4-hydroxy-benzyl)-acetic acid.

The metal salts or the amino salts of the iodinated theophylline-7-(4-hydroxy benzyl) acid, above described are water soluble and thus suitable for injection.

The non-halogenated compounds of this invention may, just as the iodinated compounds, be used as bactericides or as starting materials for the preparation of other valuable therapeutic agents.

As has been stated the iodinated compounds of this invention are suitable as X-ray contrast agents; and they may also be used as amebicidal or bactericidal agents.

The compound is particularly valuable as a contrast medium in cholecystography. It may be administered orally or intravenously in the form of its salts. The theophylline-7-(4-hydroxy-3,5-diiodo-benzyl)-acetic acid and the sodium and amino salts thereof are especially advantageous for use as contrast media because:

(1) The compound is stable having a definite chemical constitution in which the iodine is firmly attached to the benzene ring.

(2) The compound contains but one benzenoid structure with but a single phenolic group.

The importance of maintaining the phenolic group in free condition arises from the fact that such a free hydroxyl renders the compound readily available for adsorption and concentration in the gall bladder as well as for subsequent easy elimination from the body.

(3) The compound contains a purine grouping, a grouping that is completely novel in X-ray contrast agents, as a result of which the compound is rendered even more susceptible for adsorption in the gall bladder and in the urinary tract thus providing for facile elimination from the body and thereby allowing for the administration of large quantities of the compound without any appreciable toxic reaction.

The following are illustrative examples of this invention.

EXAMPLE I

*Theophylline-7-p-hydroxybenzal-acetic acid*

In a three liter flask, with thermometer, condenser and mechanical stirrer, there were placed 416 grams of anhydrous sodium salt of theophylline-7-acetic acid, 192 grams of para-hydroxybenzaldehyde and 1200 grams of acetic-anhydride. The mixture was heated with stirring at 110°–120° C. for about 24 hours. Then the acetic-anhydride and the formed acetic-acid were evaporated in vacuum. To the residue there was added 800 grams of water and 100 grams of ice, and the mixture stirred until solution occurs. To the ice-cooled solution there was added 40% sodium hydroxide solution until the solution was alkaline against phenolphthalein. An additional 200 cc. of 40% sodium hydroxide solution was then added and the mixture was heated with stirring on the water bath until the temperature reached 65° C. The mixture was allowed to stand for 2 hours at room temperature, filtered through glass-wool and poured into a mixture of 2200 of concentrated HCl and 2,000 grams of ice. After standing for 24 hours at ice-bath temperature, the product of this example came down as a precipitate. It was filtered on a Buchner funnel, and washed with water. On recrystallization from about 8 liters of boiling ethanol, 302 grams of theophylline-7-p-hydroxybenzal-acetic acid were obtained having a melting point of 254° C. The yield was 54%.

EXAMPLE II

*Theophylline-7-p-hydroxybenzyl-acetic acid*

68.4 grams of theophylline-7-p-hydroxybenzal acetic acid, the product of Example I, were dissolved in 200 cc. of water with 16.8 grams of sodium bicarbonate. One gram of 10% palladium-charcoal was added and the mixture hydrogenated with an initial hydrogen pressure of 50 pounds. After 17 hours the theoretical amount of hydrogen, corresponding to 16.5 pounds, was absorbed. The solution was filtered free from the catalyst; the filtrate mixed with 200 grams of ice and with stirring slowly acidified with a 15% HCl solution. The precipitated and crystalline product weighing 65 grams (94% yield) had a melting point of 170° C. and was the pure theophylline-7-p-hydroxybenzyl-acetic acid.

EXAMPLE III

*Theophylline-7-p-hydroxy-3,5-diiodo-benzyl-acetic acid*

68.8 grams of theophylline-7-p-hydroxybenzyl-acetic acid, the product of Example II, was dissolved in a solution of 32 grams of sodium hydroxide in 1600 cc. of water. The solution was stirred at room temperature and a solution of 101.6 grams of iodine and 100 grams of potassium iodide in 500 cc. water was added thereto dropwise over a period of about one hour. The solution was then stirred for an additional hour at room temperature; then cooled in an ice bath; and a solution of 50 grams of sodium bisulfite in 600 cc. of water added thereto with stirring, followed by the addition of 15% HCl solution to render the mixture acid against Congo red. The precipitated theophylline-7-p-hydroxy 3,5 diiodo-benzyl-acetic acid was filtered (or centrifuged) and washed three times with water; and dried at 105° C. There were obtained 104 grams (86% yield). Melting point, 270° C. On recrystallization from acetic acid the product had a melting point of 274° C.

*Analysis.*—$C_{16}H_{14}O_5N_4I_2$=595.84. Calc.: I, 42.6%; found: I, 42.1%.

EXAMPLE IV

*Sodium salt of theophylline-7-p-hydroxy-3,5-diiodobenzyl-acetic acid*

104 grams of the crude 7'-carboxy-7'-p-hydroxy-3,5 diiodobenzyl acetic acid, the product of Example III, and 15 grams of sodium bicarbonate were suspended in 450 cc. of an 80% acetone solution and then refluxed until complete solution. The hot solution was filtered, and to the filtrate there was added 500 cc. of anhydrous acetone. After standing for 24 hours at room temperature the sodium salt precipitated in crystalline form. The filtrate was evaporated in vacuum and the residue dissolved again in the smallest amount of boiling 80% acetone and the same volume of anhydrous acetone added and filtered after 24 hours standing at room temperature. Thus 90 grams of the pure sodium salt of theophylline-7-p-hydroxy-3,5 diiodobenzyl-acetic acid were obtained.

EXAMPLE V

*Piperidine salt of theophylline-7-p-hydroxy-3.5 diiodobenzyl-acetic acid*

131 grams of theophylline-7-p-hydroxy-3.5 diiodobenzyl-acetic acid were suspended in 1200 cc. of 80% ethanol and 22 grams of piperidine were added. The mixture was then refluxed until solution was complete; filtered hot and 1200 cc. of anhydrous ethanol was added. After cooling in an ice bath for 12 hours, the precipitated crystalline piperidine salt was filtered on a Buchner funnel, washed with ethanol and dried at 105° C. 112 grams of piperidine salt of theophylline-7-p-hydroxy-3.5 diiodobenzyl-acetic acid were obtained having a melting point of 189° C.

The acids above described are convertible, by similar and easy reactions, into corresponding salts as for example the alkali metal salts such as those of sodium and potassium, the alkaline earth metal salts such as those of calcium and magnesium, and the ammonium and substituted ammonium salts such as those obtained from the primary, secondary or tertiary amines as for example ethylamine, piperidine, triethylamine, the ethanolamines, diethylaminoethanol and the like.

It will be understood that the foregoing description of the invention and the examples set forth are merely illustrative of the principles of this invention; and accordingly that the appended claims are to be construed as defining the invention within the full spirit and scope thereof.

We claim:

1. Caffeine compounds of the class having the general formula

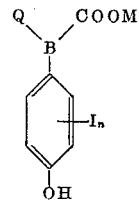

wherein: Q designates the portion of the 1,3-dimethyl xanthine molecule wherein position 7 is linked to B. M is a member of the group consisting of hydrogen, alkali metal, monovalent equivalent of an alkaline earth metal, the ammonium radical, and ammonium radicals formed of water soluble non-toxic amines B is a member of the group of monovalent radicals consisting of

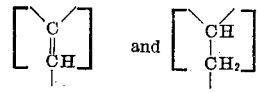

$n$ is a member of the group consisting of zero to 2.

2. Theophylline-7-(4 - hydroxy - 3,5 - diiodo - benzyl)-acetic acid.

3. An alkali metal salt of the compound of claim 2.
4. An amine salt of the compound of claim 2.
5. Theophylline-7-(4-hydroxy-benzyl)-acetic acid.
6. Theophylline-7-(4-hydroxy-benzal)-acetic acid.
7. Method of preparing theophylline-7-(4-hydroxy benzal)-acetic acid which comprises reacting 7'-carboxy caffeine with 4-hydroxy benzaldehyde in the presence of acetic anhydride and heating said reaction mixture with 40 per cent. sodium hydroxide.
8. Method of preparing theophylline-7-(4-hydroxy-benzyl)-acetic acid which comprises the catalytic reduction of theophylline-7-(4-hydroxy benzal)-acetic acid with hydrogen in the presence of palladium charcoal under a pressure starting around 50 pounds.
9. Method of preparing theophylline-7-(4-hydroxy-3,5-diiodo benzyl)-acetic acid which comprises treating theophylline-7-(4-hydroxy benzyl)-acetic acid with a solution of iodine.

References Cited in the file of this patent

UNITED STATES PATENTS 2,595,853   Horclois _____ May 6, 1952

FOREIGN PATENTS 352,980   Germany _____ May 11, 1922

OTHER REFERENCES

Chem. Abstr., 2nd Decennial Index, p. 6235.
Chem. Abstr., 17, 1307$_1$ (1923).